J. C. REED.
SYSTEM OF ELECTRIC MOTOR CONTROL.
APPLICATION FILED JUNE 4, 1912.
1,060,940.
Patented May 6, 1913.
2 SHEETS—SHEET 1.
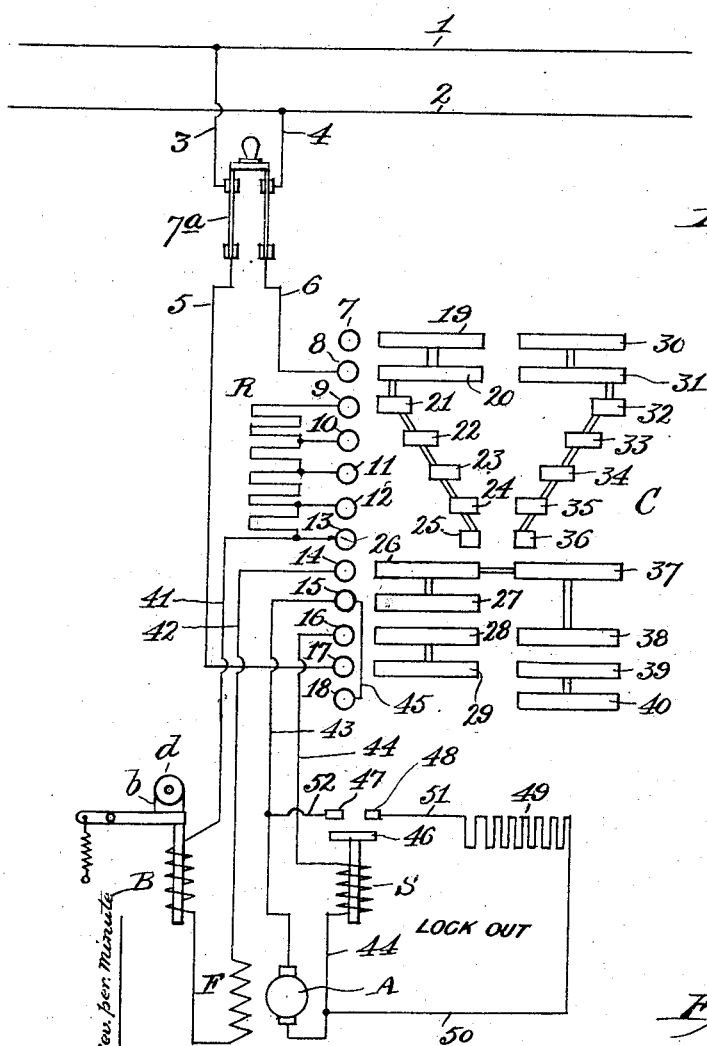
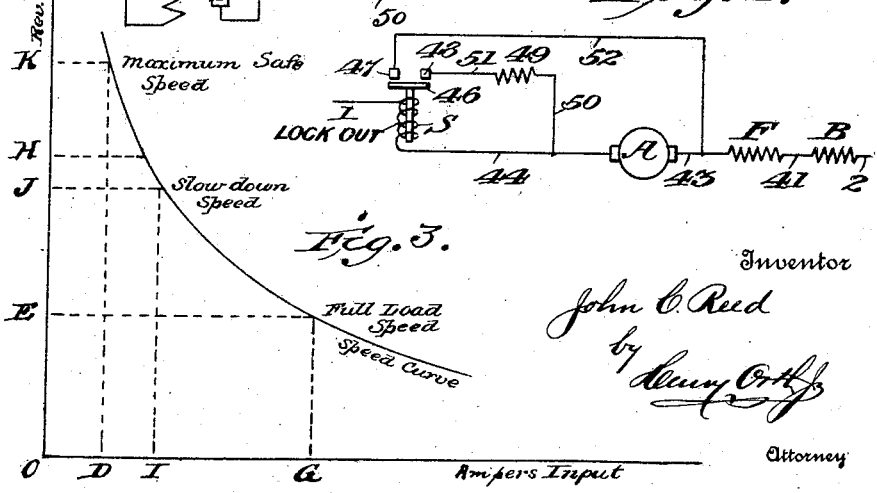
Witnesses
B. Dommers
E. Leckert.
Inventor
John C. Reed
by Henry Orth Jr.
Attorney J. C. REED.
SYSTEM OF ELECTRIC MOTOR CONTROL.
APPLICATION FILED JUNE 4, 1912.
1,060,940.
Patented May 6, 1913.
2 SHEETS—SHEET 2.
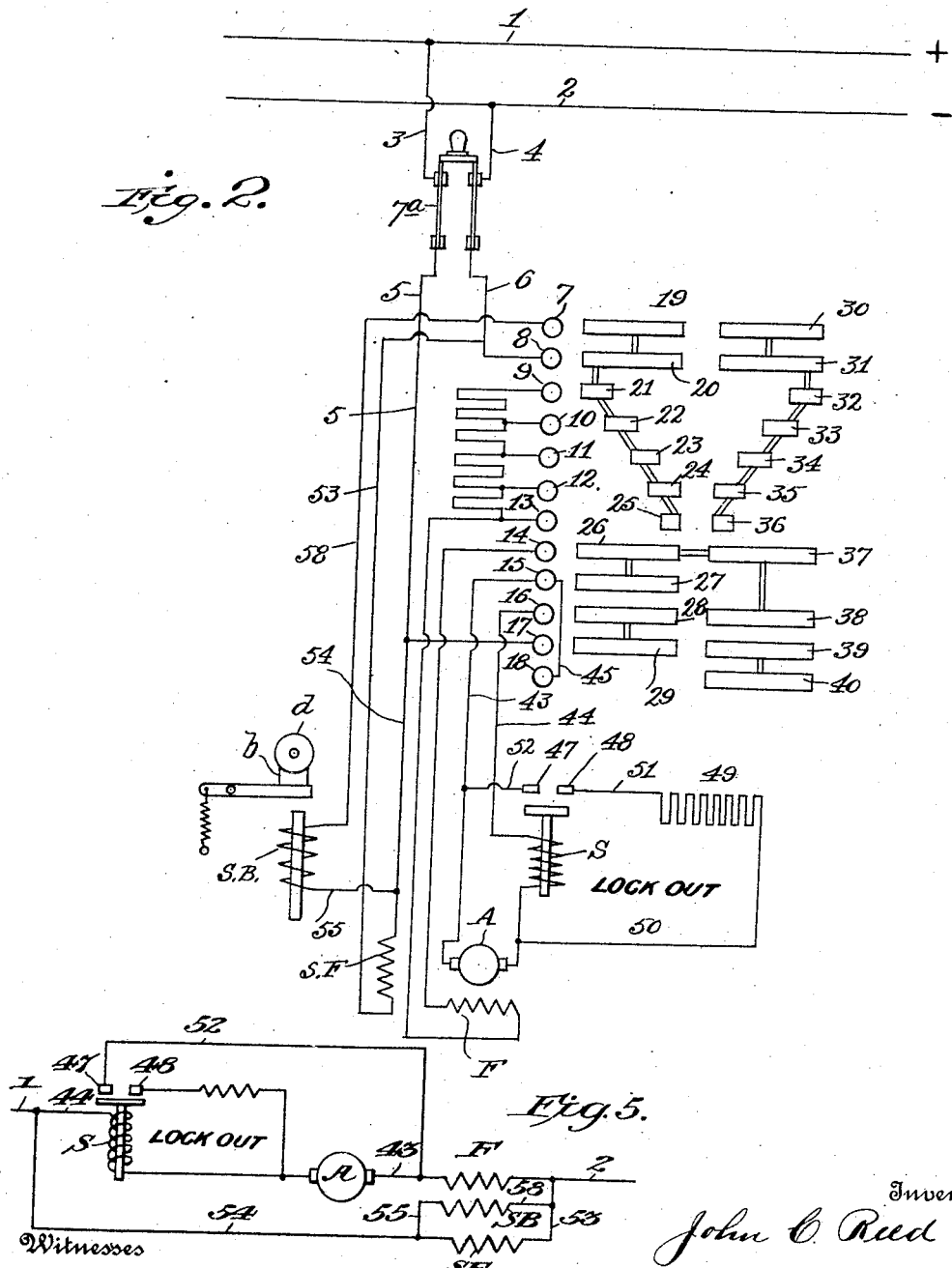

UNITED STATES PATENT OFFICE.

JOHN C. REED, OF STEELTON, PENNSYLVANIA.

SYSTEM OF ELECTRIC-MOTOR CONTROL.

1,060,940.  Specification of Letters Patent.  Patented May 6, 1913.

Application filed June 4, 1912. Serial No. 701,561.

*To all whom it may concern:*

Be it known that I, JOHN C. REED, a citizen of the United States, residing in the borough of Steelton, county of Dauphin, and State of Pennsylvania, have invented certain new and useful Improvements in Systems of Electric-Motor Control; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to control systems for the electric motors for controlling the series or compound wound electric motors of electric hoists, street cars, electric motor vehicles, cranes and other machines driven by such motors where it is desirable to have a simple and efficient motor control and for preventing the motor from attaining too high speed.

In order that my invention may be clearly understood, I have illustrated as an example thereof, the system of control in connection with an electric motor operated hoisting crane, having selected this type of machine for illustration by reason of its operating under great variations of load.

Experiments which I have made in connection with hoisting cranes as well as other machines embodying my invention have given highly satisfactory results and show many advantages over existing systems, as will hereinafter be explained.

Referring to the drawings that illustrate diagrammatically a hoisting crane embodying my invention, and in which like parts are similarly designated—Figure 1 is a diagram illustrating the system of electric control applied to a crane operated by a series wound electric motor. Fig. 2 is a similar diagram, including a compound wound instead of a series wound motor. Fig. 3 is a characteristic speed curve of a series wound motor illustrating its use with my invention applied thereto. Fig. 4 is a simplified diagram similar to Fig. 1, with the controller omitted. Fig. 5 is a simplified diagram similar to Fig. 2, with the controller omitted.

Referring to Fig. 1, wherein I have illustrated a series wound motor, 1 and 2 are the supply mains, from which are branched taps 3 and 4 to which the wires 5 and 6 are connected by a suitable switch 7ª. C is a well known type of reversing controller, the general structure of which forms no part of my invention. This controller comprises a number of stationary contacts 7 to 18 and two sets of movable or wiper contacts coöperating with the stationary contacts to effect that control of the crane desired under all conditions of operation. One of these sets of movable contacts for lowering the load comprises the contacts 19 to 29, of which 19 to 25 are electrically connected by suitable connectors; 26 and 27 are likewise electrically connected, as are also 28 and 29. The other set of movable contacts is used for raising the load, and consists of the contacts 30 to 40, of which those 30 to 36 are electrically connected by suitable connectors, 37 and 38 are likewise electrically connected, as are also 39 and 40; 26 and 37 are electrically connected as shown. The movable contacts 21 to 25, and 30 to 36, and the stationary contacts 9 to 13 coöperate to place resistance R in the motor circuit, said resistance being connected to the stationary contacts 9 to 13, as shown. Wire 6 is connected to stationary controller contact 8. Stationary controller contacts 13 and 14 are connected to wires 41 and 42 respectively containing the winding B of the electro-magnetic brake $b$ for the hoisting drum $d$ and also containing the field winding F of the motor. Stationary controller contacts 15 and 16 are connected, respectively to wires 43 and 44 of the armature A of the motor. Stationary controller contact 17 is connected to supply wire 5, and contact 18 is connected by a connector 45 to contact 15. In series with the armature is a winding or coil $s$ that operates a circuit closer 46 of any suitable solenoid switch or relay arranged to lock out when currents in excess of a certain value pass through its winding, and to close when the current has decreased to said value, and that is capable of adjustment to close upon any desired drop of current. This type of switch is well known, and its specific structure forms no part of my invention, as I may use any other form of electric mechanism that is dependent for its operation on the speed of rotation of the armature, but I prefer the one described, as its action is positive and reliable, by reason of being controlled by the current through the armature. Connected across wires 43 and 44, that is in parallel with the armature A of the motor, is a resistance 49. As shown, this resistance is connected by wire 50 to wire 44, and by wire 51 to switch contact 48. Switch contact 47 is connected by wire 52 to wire 43.

The operation when the crane is lowering a load is as follows: Current from line 1, tap 3, switch 7$^a$ and wire 5, will pass to stationary contact 17 of the controller, movable contact 29, to movable contact 28, stationary contact 16, wire 44, coil or winding s armature A of the motor, wire 43, stationary controller contact 15, movable controller contacts 27 and 26, stationary controller contact 14, wire 42, series field F of the motor, brake winding B, wire 41, resistance R, stationary controller contact 9, movable controller contacts 21 and 20, stationary controller contact 8, wire 6, tap 4, and main 2. This current will cause the brake b to be released. The rotation of the controller gradually cuts out the resistance R from the circuit until contacts 25 and 13 touch, when all resistance is cut out, the motor will then accelerate according to the curve Fig. 3. When the resistance R has all been cut out by the controller, full load current is flowing and full load speed will be attained at G amperes current input and E revolutions per minute. Since the load is descending the motor will have little work to do, and will accelerate rapidly until a maximum safe speed K will have been attained with a current input of D amperes, when, by reason of the drop of current, the switch S will operate to bridge contacts 47 and 48, and connect the resistance 49 in parallel with the armature A. That portion of the current passing from line 1, resistance 49 series field F and brake winding b to line 2 will cause the field F to be increased from D amperes to I amperes, and this increase of strength in the field will cause the counter E. M. F. to be raised higher than the impressed E. M. F. of the line, causing a current to flow from armature A, wires 44, 50, resistance 49, wire 51, contacts 48, 47, wires 52 and 43, back to armature A, and this current will continue to flow until the speed of the armature A is reduced from K to J revolutions per minute, thus dynamically braking the armature through the resistance 49. Should the action of gravity on the load be sufficient to make it overhaul the machinery and motor, then the speed will not be reduced from K to J, but from K to H, and the motor will continue to act as a generator and dissipate the current, as heat, in the resistance 49. When the load has been lowered R is cut in, and the motor stopped at the proper point by turning the controller to the cut-off position, thus applying the brake b; the current is cut off entirely by the controller at off position, when none of the movable contacts of the controller engage any of the stationary contacts. When the controller is turned to raise the load the direction of the current through the armature is reversed from that just described, and current enters as follows:—line 1, tap 3, switch 7$^a$, conductor 5, contacts 17, 39, 40, 18, connector 45, contact 15, wire 43, armature A, wire 44, winding s contacts 16, 38, 37, 14, wire 42, field winding F, brake winding B, wire 41, resistance R, contacts 9, 32, 31, 8, wire 6, switch 7$^a$ and tap 4 to line 2. Further rotation of the controller successively cuts out resistance R by successively closing and opening the following pairs of controller contacts: 32, 9—33, 10—34, 11—35, 12— and 36, 13, as is usual in controllers.

Referring to Fig. 2, in which a compound wound motor is illustrated, it will be noted that the system is identical with that shown in Fig. 1, where a series wound motor is used, with the exception that the shunt field S. F., or winding of the armature, has one end connected by line 53 to stationary contact 8 of the controller and the other end thereof connected by wire 54 to supply wire 5. The shunt winding S. B. for the brake solenoid is connected in parallel with the shunt field S. F. by wires 55 and 56 and stationary contacts 7 and 8. In this case the resistance 49 will be placed in parallel with the armature A and current through it will then pass to the series field F as described with reference to Fig. 1.

So far as my invention is concerned, it is immaterial whether a series, a shunt, or a compound wound brake be used. My invention, therefore, consists in connecting a resistance to the armature of the motor, there being electrical means to connect said resistance at a predetermined speed of the armature, which is dependent upon the current, and I prefer to use electrical means in series with the armature to effect said connection, thereby providing a dynamic load for the motor.

The following are the advantages of my system of motor control: It requires no alterations to be made, such as are generally required. It can be operated in connection with any type of controller. It does not interfere with the speed in lowering an empty hook of a crane, so objectionable in other forms of dynamic braking controllers. It may be used in connection with a mechanical brake which is not the case with other forms of dynamic braking controllers. It does not require any alterations to be made in the wiring of the equipment other than the insertion of the series operating coil of the switch S, and the connection of the resistance 49 in series with the contacts 47—48 across the armature. It will operate in connection with any type of electric holding brake that will operate without it, which is not the case with other types of dynamic braking controllers. It will operate equally well in either direction of rotation of the motor armature, which is not the case with other types of dynamic braking controllers. The cost of this equipment to manufacture and install will be very much less than that of any other type of dynamic braking device now used. It is extremely simple, and has only one moving part, which operates without lubrication; and is therefore very much more reliable than any other form of dynamic braking device known to me. The entire equipment occupies very little space, and may be located in any out-of-the-way place.

I claim—

1. In a motor control system, a motor having an armature, and a field winding in series therewith, a resistance, and means to automatically connect said resistance in parallel with the armature by drop of current in the armature circuit to a pre-determined value.

2. In a motor control system, a motor having an armature, and a field winding in series therewith, a resistance, and means to automatically connect said resistance in parallel with the armature when the armature reaches a predetermined speed.

3. In a motor control system, a motor having an armature, and a field winding in series therewith, a resistance, and means operated by the drop in current through the armature to automatically connect said resistance in parallel to the armature and simultaneously strengthen the field.

4. In a motor control system, a motor having an armature and a field winding, a controller arranged to connect said armature and field winding in series, a resistance, means operated by the drop of current through the armature to automatically connect the resistance in parallel with the armature and in series with the field winding, thereby increasing the current in said field winding.

5. In a motor control system, a motor having an armature and a field winding, a resistance, and means dependent upon the speed of rotation of the armature to automatically connect said resistance in parallel to the armature and in series with the field.

6. In a motor control, a motor having an armature and a field, a resistance connected in parallel with the armature in open circuit, and electro-magnetic means in the armature circuit arranged to maintain said resistance circuit open when currents in excess of a pre-determined adjustable value pass through said means, and also arranged to close said resistance circuit when current has decreased to the adjusted value.

7. In a motor control system, a motor having an armature and a field, a resistance, and means automatically operated by drop of current in the armature circuit to a pre-determined value to dynamically brake the armature through said resistance.

8. In a motor control, a motor having an armature and a field, a resistance, and electro-magnetic means to automatically maintain said resistance out of circuit when the armature does not exceed a pre-determined speed, and to automatically dynamically brake said armature through said resistance when the armature exceeds said speed.

In testimony that I claim the foregoing as my invention, I have signed my name in presence of two subscribing witnesses.

JOHN C. REED.

Witnesses:
 GEO. W. PARSONS,
 GEO. J. WALZ.

---

Copies of this patent may be obtained for five cents each, by addressing the "Commissioner of Patents, Washington, D. C."